(12) United States Patent  (10) Patent No.: US 8,457,618 B2
Narasimha et al.  (45) Date of Patent: Jun. 4, 2013

(54) PREVENTING RANDOM ACCESS BASED ON OUTDATED SYSTEM INFORMATION IN A WIRELESS COMMUNICATION SYSTEM

(75) Inventors: Murali Narasimha, Lake Zurich, IL (US); Richard C. Burbidge, Hook (GB); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 623 days.

(21) Appl. No.: 12/483,843

(22) Filed: Jun. 12, 2009

(65) Prior Publication Data

US 2009/0318128 A1    Dec. 24, 2009

Related U.S. Application Data

(60) Provisional application No. 61/074,211, filed on Jun. 20, 2008.

(51) Int. Cl.
H04M 3/00 (2006.01)
H04M 3/42 (2006.01)

(52) U.S. Cl.
USPC ................................. 455/418; 455/414.1

(58) Field of Classification Search
None
See application file for complete search history.

(56) References Cited

U.S. PATENT DOCUMENTS

| 5,517,681 | A | 5/1996 | Talarmo |
| 6,351,459 | B1 | 2/2002 | Kondo |
| 6,636,496 | B1 | 10/2003 | Cho et al. |
| 2005/0164683 | A1* | 7/2005 | Roberts et al. ............ 455/412.2 |
| 2005/0249140 | A1* | 11/2005 | Lee et al. ...................... 370/312 |
| 2008/0261570 | A1* | 10/2008 | Baker et al. ................ 455/414.1 |
| 2009/0156196 | A1* | 6/2009 | Somasundaram et al. .... 455/423 |

FOREIGN PATENT DOCUMENTS

| EP | 1553797 B1 | 7/2005 |
| WO | 2004064272 A1 | 7/2004 |
| WO | 2007049204 A1 | 5/2007 |
| WO | 2007133034 A2 | 11/2007 |

OTHER PUBLICATIONS

Panasonic "TP for System Information Change Notification" 3GPP TSG RAN WG2 #62, R2-082835; May 5-9, Kansas City, USA; 8 pages.
Nokia "System Information Scheduling—Clarifications" 3GPP TSG RAN WG2 Meeting #60bis, R2-080156; Jan. 14-18, 2008 Seville, Spain; 4 pages; XP50138036.
Huawei "System Information Change Issues" 3GPP TSG RAN WG2 #61bis; R2-081636; Mar. 31-Apr. 4, Shenzhen, China; 2 pages; XP50139359.
Motorola "System Information Change During Connection Setup Procedure" 3GPP TSG-RAN WG2#63, R2-084212; Aug. 18-22, 2008, Jeju Korea; 14 pages; XP50319335.
PCT Search Report; PCT Application No. PCT/US2009/047720; Oct. 13, 2009; 15 pages.
3GPP TSG RAN WG2 RRC adhoc Jun. 5-6, Sophia ANtipolis, France RS-082942.
Mexican Patent Office "Substantive Examination" for Mexican Patent Application No. 102648 (CS36024) dated Nov. 27, 2012, 2 pages.

* cited by examiner

*Primary Examiner* — Dwayne Bost
*Assistant Examiner* — Christopher Kohlman

(57) ABSTRACT

A method for preventing random access by a mobile station with outdated system information includes, in the mobile station, receiving system information earlier than a time instant at which the system information become effective, determining that a current time is within a new access blocking offset before the time instant at which the system information becomes effective, and delaying random access at least until the time instant at which the system information becomes effective.

19 Claims, 5 Drawing Sheets

PREVENTING RANDOM ACCESS BASED ON OUTDATED SYSTEM INFORMATION IN A WIRELESS COMMUNICATION SYSTEM

CROSS REFERENCE TO RELATED APPLICATIONS

The present application claims benefits under 35 U.S.C. 119(e) from U.S. provisional Application No. 61/074,211 filed on 20 Jun. 2008, the contents of which are incorporated herein by reference.

FIELD OF THE DISCLOSURE

The present disclosure relates generally to wireless communications and, more specifically, to preventing random access in a wireless communication system that provides updated system information messages, network entities, user terminals and corresponding methods.

BACKGROUND

System information in Third Generation Partnership Project (3GPP) Universal Mobile Terrestrial System (UMTS) Long Term Evolution (LTE) systems includes parameters needed by a wireless communication mobile station (MS), hereafter also referred to as user equipment (UE), for correct operation. This information is grouped into different information blocks including a Master Information Block (MIB) and several System Information Blocks (SIB). Generally, UEs are expected to use the currently valid system information set at all times. To manage changes of system information (SI), the notion of a modification period is used. When the network needs to change a SI parameter, a change indication is first transmitted for a duration known as a modification period. The actual changed SI is transmitted in a subsequent modification period. This framework ensures that a UE in idle mode or in connected mode gets an indication of the SI change and subsequently reads the changed SI. However, if a SI change occurs when a UE is attempting to establish a connection, the UE may use old SI.

Potential problem scenarios are discussed below where the SI change period and radio resource control (RRC) connection establishment overlap. The first scenario resulted from a discussion of 3GPP technical document R2-082942.

In one scenario illustrated in FIG. 1, a UE receives an SI change indication and a page at the same time. Alternatively, a similar problem arises if the UE decides to originate very shortly after receiving a SI change indication. The ensuing random access channel (RACH) attempts cross the modification period boundary and because of the time required for the UE to read SI, a UE RACH attempt that occurs after the modification period boundary will use old SI. This may be problematic as the PHICH duration or resource may have changed leading to failure after the UE enters connected mode. The same problem results, though less frequently, from the following circumstances: a change of other MIB parameters; cell barring status may have changed; a change in time division duplex (TDD), UL/DL split; a change in the RACH parameters (e.g., root sequence, PRACH resources, preamble split, random access (RA) response window, preamble_trans_ max, . . . ) leading to failed RACH attempts and interference to other UEs; access class barring may have been switched on which the UE would be violating.

In another scenario illustrated in FIG. 2, a UE originates in a modification period where the SI is being modified, but the origination is started before the UE's paging occasion, so the UE is unaware of the SI change at the time of origination. This scenario requires the UE to continue monitoring paging for the SI change indication, which is contrary to Proposal 1 of 3GPP technical document R2-082942. Assuming that the UE receives the SI change indication, the UE still cannot receive the changed SI and all the problems mentioned above are possible.

In yet another scenario illustrated in FIG. 3, a UE interrupts RACH attempts when the modification period boundary is reached, and the UE reads the new SI, and then restarts the RACH attempts. Particularly, at the modification period boundary the UE suspends T300 and starts reading MIB, SIB1, SIB2. After the modification period boundary, the UE does not RACH until reading MIB, SIB1, SIB2. After the modification period boundary, UE does not receive/act on a RACH response until a RACH is sent after reading MIB, SIB1, SIB2. This is to avoid the following situation where the UE sends the RACH before the modification period boundary, and receives a RACH response with an UL grant after the modification period boundary. The UE should not send message 3 before reading SI, but the UL grant is not valid for that long. So the UE has to simply ignore the RACH response. The UE sends the RACH again after reading MIB, SIB1, SIB2. In FIG. 3, the UE restarts T300 and continues the RACH procedure after reading MIB, SIB1 & SIB2. The problem with this solution is that each time there is a SI change no UE can perform any UL transmissions until reading the SI. Reading the SI can take more than a second and ~300 ms for the most critical information. This duration then becomes a blackout period for the system resulting in wasted capacity and delay to various applications in UE. This problem becomes particularly acute when the SI is changed relatively frequently for load management purposes during peak hours.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Two embodiments are provided that address the problematic use of old system information without causing the blackout period described above.

Figure 1:
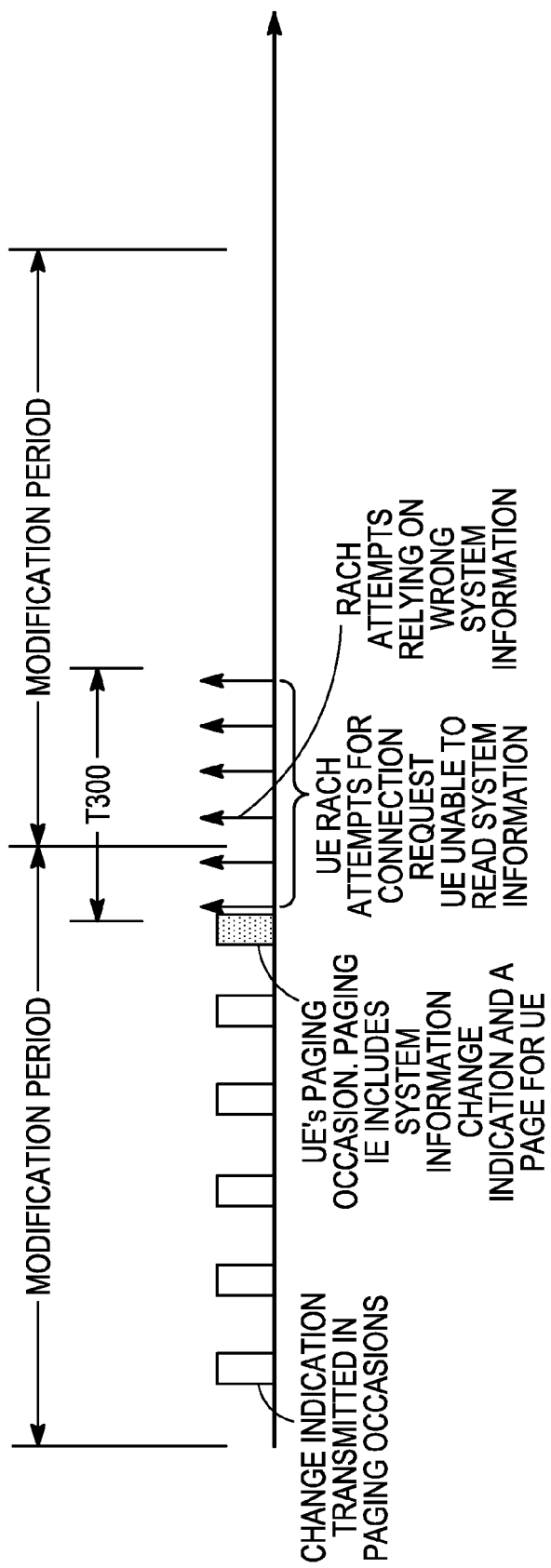
FIG. 1 illustrates a first prior art system access process time line.
Figure 2:
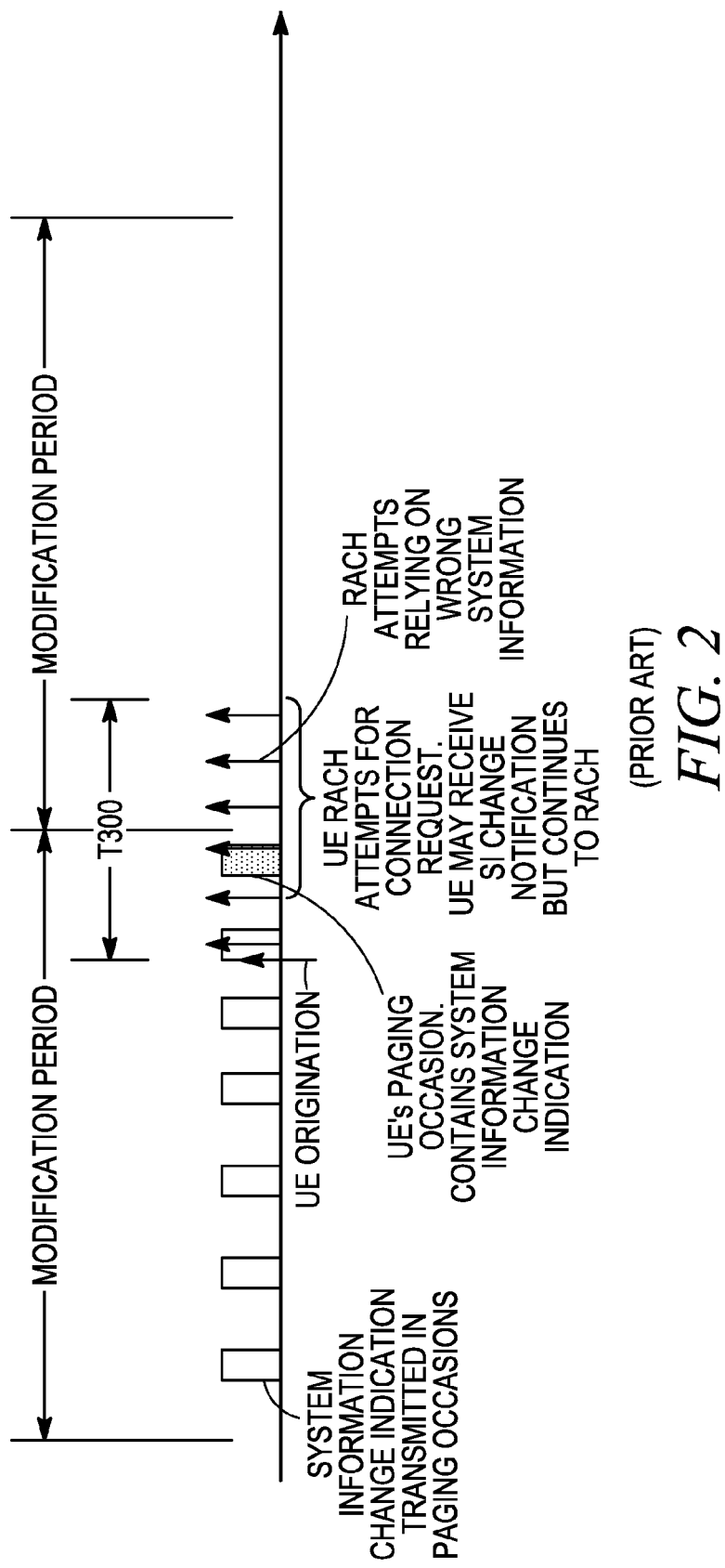
FIG. 2 illustrates a second prior art system access process time line.
Figure 3:
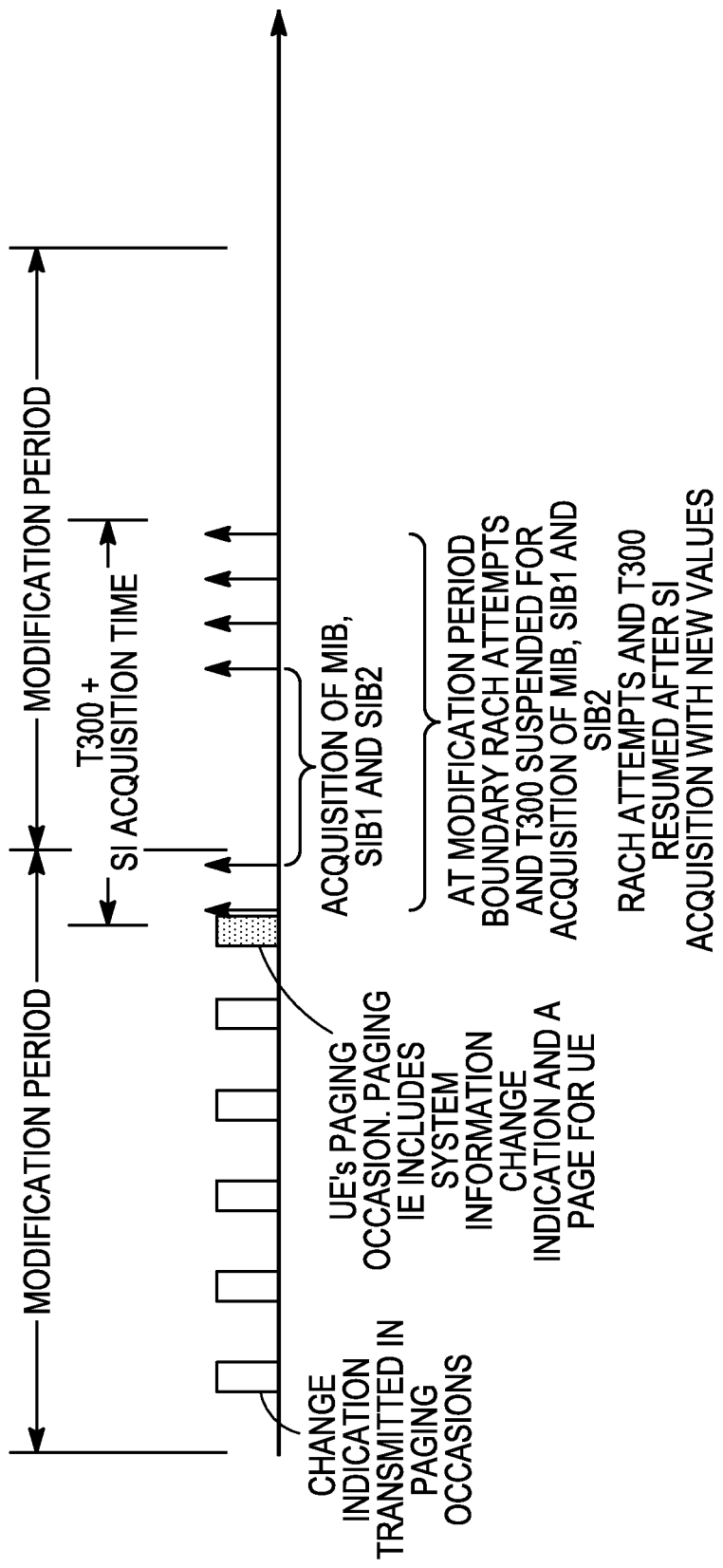
FIG. 3 illustrates a third prior art system access process time line.
Figure 4:
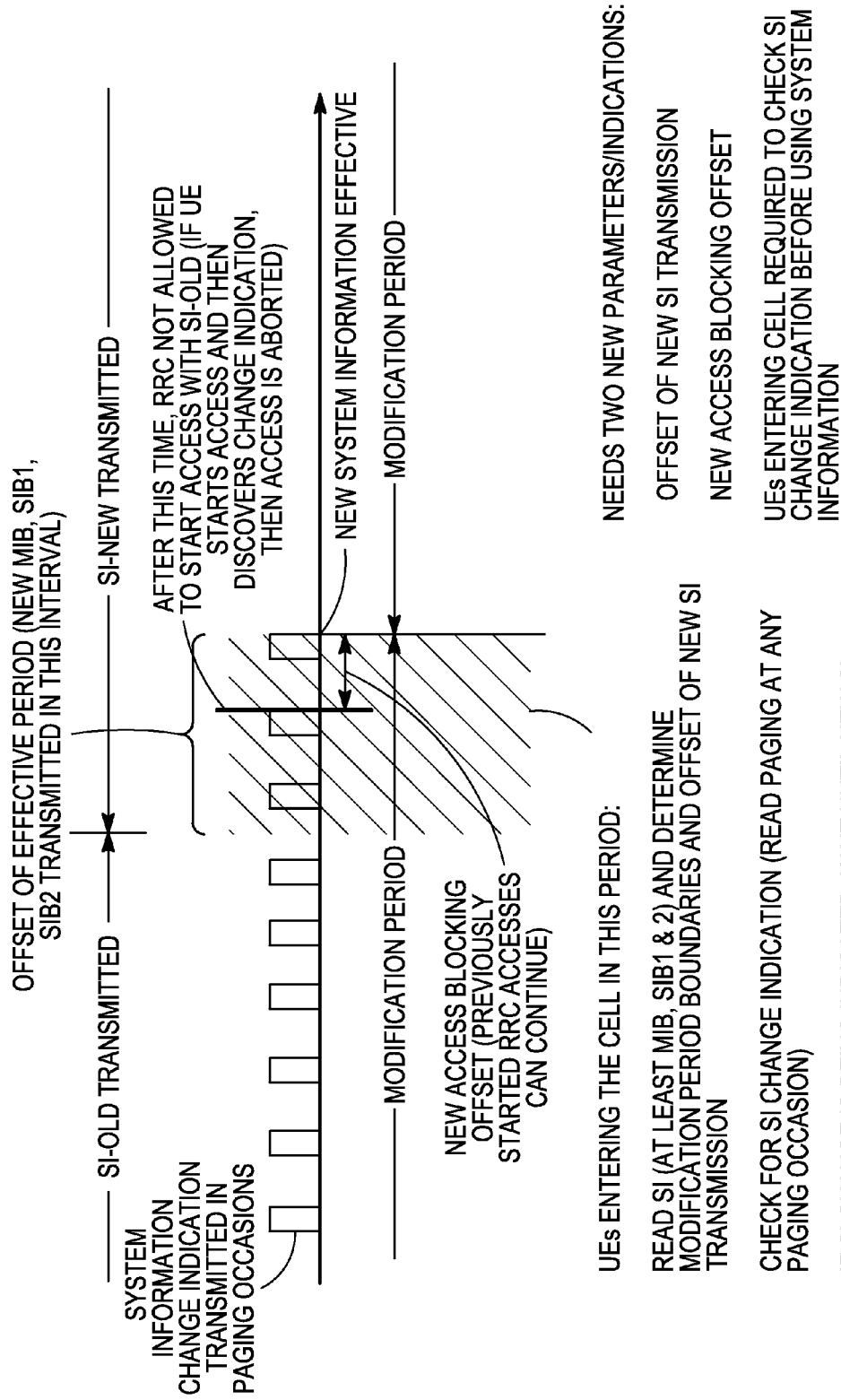
FIG. 4 illustrates an alternative system access process time line.

FIG. 4 illustrates an effective period offset approach. In the first embodiment the new MIB, SIB1 & SIB2 are transmitted "Offset of Effective Period" before the modification period where the new SI is effective. After a time "New Access blocking offset" prior to the new SI effective period, the UE radio resource control (RRC) is disallowed from starting access procedure. Previously started accesses are allowed to continue. If a UE RRC starts a new access after the "New Access Blocking Offset" and then sees an SI change indication, then the UE aborts its access attempt. UEs that enter the cell in the interval when the new SI is transmitted before it is effective wait until the effective time before accessing. Such a UE reads SI (at least MIB, SIB1, SIB2) to get modification period boundary and "Offset of Effective Period" information. The UE then checks for a SI change indication. If an SI change is being indicated, the UE waits at least until the SI effective period before new SI is used.

Figure 5:
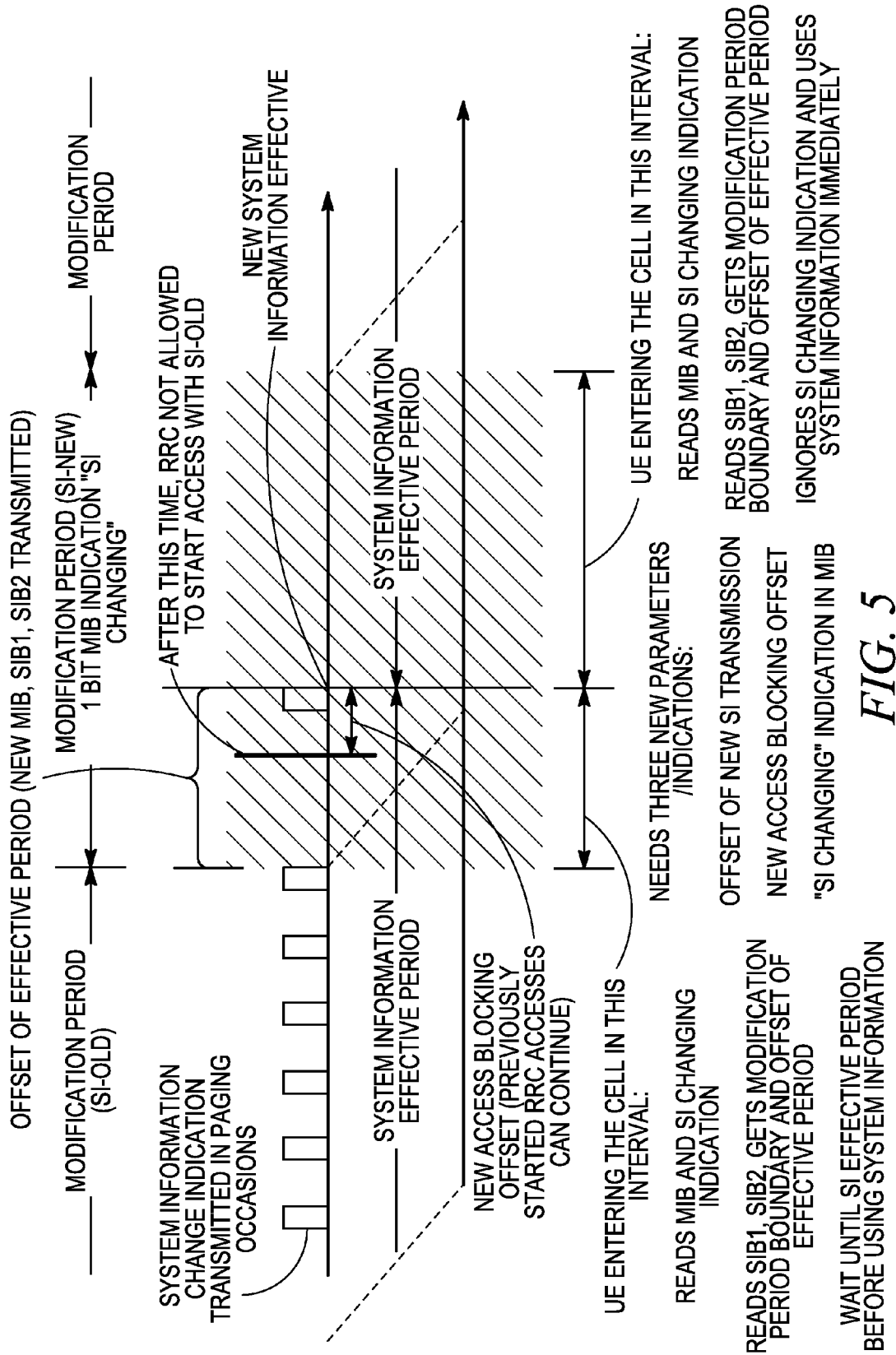
FIG. 5 illustrates another alternative system access process time line.

FIG. 5 illustrates an offset between the modification period and the SI effective period approach. In this embodiment, an offset is introduced between the modification period and the SI effective period (SI effective period is later than the modification period by "Offset of effective period"). After time "New Access blocking offset" prior to the new SI effective period, UE RRC is disallowed from starting access procedure. Previously started accesses are allowed to continue. A 1 bit "SI-changing" indication is included in the MIB. This is turned on in the first modification period where new SI is transmitted. UEs that enter the cell in the interval when the new SI is transmitted before it is effective wait until the effective time before accessing. Such a UE reads MIB and finds the "SI changing" indication to be on. The UE then reads SIB1 (and SIB2) to get a modification period and an "Offset of effective period", and the UE determines if it is within "Offset of effective period" prior to the next SI effective period. If the UE is within the "Offset of effective period", the UE waits at least until the SI effective period before using the new SI.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication mobile station for preventing random access with outdated system information, the mobile station comprising:
   a transceiver coupled to a processor,
   the processor configured to cause the transceiver to receive system information earlier than a time instant at which the system information becomes effective;
   the processor configured to determine that a current time is within a new access blocking offset before the time instant at which the system information becomes effective; and
   the processor configured to delay random access at least until the time instant at which the system information becomes effective.

2. The mobile station according to claim 1 wherein the time instant at which the system information becomes effective coincides with a start time of a modification period.

3. The mobile station according to claim 1 wherein the time instant at which the system information becomes effective is later than a start time of a modification period.

4. The mobile station according to claim 1, the processor configured to cause the transceiver to receive modified system information wherein a duration by which the reception of the modified system information is received from the base station precedes the time instant at which the system information becomes effective.

5. The mobile station according to claim 1, the processor configured to determine that a current time is within a new access blocking offset before the time instant at which the system information becomes effective by determining that a current time is prior to the new access blocking offset before the time instant at which the system information becomes effective, and the processor configured to continue random access using the system information valid at the current time.

6. The mobile station according to claim 1 the processor configured to determine that the received system information is modified system information.

7. The mobile station according to claim 1, the processor configured to cause the transceiver to receive a system information changing indication.

8. A wireless communication base station, the base station comprising:
   a transceiver coupled to a processor,
   the processor configured to cause the transceiver to transmit modified system information earlier than a time instant at which the modified system information becomes effective, and
   the processor configured to indicate to a mobile station that start of an access attempt is not allowed until after a new access blocking offset prior to the time instant at which the modified system information becomes effective.

9. The base station according to claim 8 wherein the time instant at which the modified system information becomes effective coincides with a start time of a modification period.

10. The base station according to claim 8 wherein the time instant at which the system information becomes effective is later than a start time of a modification period.

11. The base station according to claim 8, the processor configured to cause the transceiver to transmit a system information change indication concurrently with transmission of the modified system information.

12. The base station according to claim 8 wherein the modified system information further includes for a finite duration a system information changing indication.

13. The base station according to claim 8 wherein a duration by which the transmission of the modified system information precedes the time instant at which the modified system information becomes effective is transmitted by the base station.

14. A wireless communication device comprising:
   a transceiver;
   a controller coupled to the transceiver,
   the controller configured to decode system information received by the transceiver and to obtain modified system information prior to a time instant at which the modified system information becomes effective, and
   the controller configured to delay a connection establishment attempt when a connection establishment attempt could result in an access attempt using outdated system information.

15. The wireless communication device according to claim 14, wherein the controller is configured to determine that a connection establishment attempt could result in an access attempt using outdated system information by determining that a current time is less than a new access blocking offset prior to the time instant at which the modified system information becomes effective.

16. The wireless communication device according to claim 14, wherein the controller is configured to indicate that reselection has occurred.

17. The wireless communication device according to claim 14, the controller is configured to determine that the system information transmitted by the base station is effective at a later time and to delay a connection establishment attempt until the system information becomes effective.

18. The wireless communication device according to claim 16, wherein the controller is configured to determine if the system information is effective at a later time by
- determining that the current time is within an offset of an effective period prior to a time instant at which the system information becomes effective, and
- receiving a system information change indication on the paging channel.

19. The wireless communication device according to claim 16, wherein the controller is configured to determine if the system information is effective at a later time by determining that the current time is within an offset of effective period prior to a time instant at which the system information becomes effective, and the controller is configured to decode a system information changing indication from the system information.

* * * * *